(12) United States Patent
Yamada et al.

(10) Patent No.: US 7,693,539 B2
(45) Date of Patent: Apr. 6, 2010

(54) MOBILE COMMUNICATION SYSTEM, RADIO NETWORK CONTROLLER, BASE STATION AND COMMUNICATION METHOD

(75) Inventors: Mayu Yamada, Yokohama (JP); Takehiro Nakamura, Yokosuka (JP); Minami Ishii, Yokohama (JP); Masafumi Usuda, Yokosuka (JP); Sung Uk Moon, Yokosuka (JP); Akihito Hanaki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 965 days.

(21) Appl. No.: 10/699,891

(22) Filed: Nov. 4, 2003

(65) Prior Publication Data

US 2004/0092289 A1 May 13, 2004

(30) Foreign Application Priority Data

Nov. 5, 2002 (JP) ............................. 2002-321772

(51) Int. Cl.
H04B 7/00 (2006.01)
H04B 1/26 (2006.01)
H04J 1/16 (2006.01)
H04J 1/00 (2006.01)
H04J 3/12 (2006.01)

(52) U.S. Cl. .................... 455/525; 455/332; 370/231; 370/525

(58) Field of Classification Search ................ 370/231, 370/525; 455/332, 525
See application file for complete search history.

(56) References Cited

U.S. PATENT DOCUMENTS 6,014,694 A * 1/2000 Aharoni et al. ............. 709/219
6,072,769 A * 6/2000 Ho ............................. 370/204

(Continued)

FOREIGN PATENT DOCUMENTS

| CN | 1271488 A | 10/2000 |
| WO | WO 99/05828 | 2/1999 |
| WO | WO 01/74027 | 10/2001 |

OTHER PUBLICATIONS

ETSI TS 100 593, V8.0.0, Technical Specification, XP-002219067, pp. 1-19, "Digital Cellular Telecommunications System (Phase 2+); Base Station Controller-Base Transceiver Station (BSC—BTS) Interface; Interface Principles (GSM 08.52 Version 8.0.0 Release 1999)", Jun. 2000.

(Continued)

Primary Examiner—Matthew D Anderson
Assistant Examiner—Bobbak Safaipour
(74) Attorney, Agent, or Firm—Oblon, Spivak, McClelland, Maier & Neustadt, L.L.P.

(57) ABSTRACT

A mobile communication system comprises: a determination unit configured to determine as to layers of data to be transmitted by base stations to mobile stations for respective radio areas, based on area resource information concerning radio resources for the respective radio areas covered by the base stations; and a radio transmitter configured to transmit the data to the mobile stations according to a determination of the determination unit.

8 Claims, 10 Drawing Sheets

U.S. PATENT DOCUMENTS

| | | | |
|---|---|---|---|
| 6,404,783 B1 * | 6/2002 | Cimini et al. | 370/525 |
| 6,483,820 B1 * | 11/2002 | Davidson et al. | 370/329 |
| 7,006,484 B2 * | 2/2006 | Hayama et al. | 370/342 |
| 2003/0135867 A1 * | 7/2003 | Guedalia | 725/126 |
| 2004/0083495 A1 * | 4/2004 | Lane et al. | 725/127 |
| 2005/0152398 A1 * | 7/2005 | Shin | 370/469 |
| 2006/0072519 A1 * | 4/2006 | Hayama et al. | 370/335 |

OTHER PUBLICATIONS

"$3^{rd}$ Generation Partnership Project; Technical Specification Group Terminals; Technical Realization of Cell Broadcast Service (CBS) (Release 1999)", 3GPP TS 23.041 V3.3.0, Oct. 2000, pp. 1-37.

"$3^{rd}$ Generation Partnership Project; Technical Specification Group Radio Access Network; Broadcast/Multicast Control BMC (Release 1999)", 3GPP TS 25.324 V3.3.0, Dec. 2000, pp. 1-23.

* cited by examiner

| LAYER | NUMBER OF CHANNELS REQUIRED FOR TRANSMITTING |
|---|---|
| LAYER C : SUB-VOICE DATA | 15 CHANNELS |
| LAYER B : VOICE DATA | 10 CHANNELS |
| LAYER A : VISUAL DATA | 5 CHANNELS |

| LAYERING METHOD | THRESHOLD VALUE FOR LAYERING |
|---|---|
| NUMBER OF MULTIPLEXED CODES | GREATER THAN OR EQUAL TO 20 CODES |
| TRANSMISSION POWER | GREATER THAN OR EQUAL TO 40 % |

MOBILE COMMUNICATION SYSTEM, RADIO NETWORK CONTROLLER, BASE STATION AND COMMUNICATION METHOD

CROSS REFERENCE TO RELATED APPLICATIONS

This application is based upon and claims the benefit of priority from the prior Japanese Patent Application No. P2002-321772, filed on Nov. 5, 2002; the entire contents of which are incorporated herein by reference.

BACKGROUND OF THE INVENTION

1. Field of the Invention

The present invention relates to a mobile communication system, a radio network controller, a base station and a communication method.

2. Description of the Related Art

Conventionally, broadcast communication and multicast communication have been used. In broadcast communication, a base station simultaneously transmits, to an unspecified number of mobile stations located in a radio area covered by the base station, data common to the unspecified number of mobile stations. In multicast communication, a base station transmits, to mobile stations belonging to a specific group, data common only to the mobile stations belonging to the specific group (see, for example, 3rd Generation Partnership Project Technical Specification Group Terminals, "23.041 Technical realization of Cell Broadcast Service (CBS)", October 2000; and 3rd Generation Partnership Project Technical Specification Group Radio Access Network, "25.324 Broadcast/Multicast Control BMC", December 2000).

In one form of multicast communication, the data to be transmitted by multicast communication is layered, i.e., divided into plural layers, and then the layered data is transmitted (see, for example, Samsung, "MBMS-000033 Scalable MBMS (slides)", 3rd Generation Partnership Project MBMS Workshop, May 2002; and Lucent Technology, "3GPP TSG-RAN, R2-022110 MBMS power usage", August 2002).

In conventional multicast communication, however, the condition of radio resources for respective radio areas covered by base stations, which transmit data is not taken into consideration at all. As a result, when the condition of radio resources for respective radio areas is different, some of the base stations may run short of radio resources and fail to transmit data. On the other hand, some of the other base stations have surplus radio resources, which may be wasted. If there are few available radio resources, multicast communication may apply pressure on the traffic of data transmission other than the multicast communication.

BRIEF SUMMARY OF THE INVENTION

An object of the present invention is to provide a mobile communication system, a radio network controller, a base station and a communication method, for enabling appropriate utilization of radio resources.

A mobile communication system according to the present invention comprises: a determination unit configured to determine as to layers of data to be transmitted by base stations to mobile stations for respective radio areas, based on information concerning radio resources for the respective radio areas covered by the base stations (hereafter referred to as "area resource information"); and a radio transmitter configured to transmit the data to the mobile stations according to a determination of the determination unit.

According to the mobile communication system as described above, the determination unit determines as to the layers of data which the base stations transmit to the mobile stations for each radio area, based on the area resource information. The radio transmitter then transmits the data to the mobile stations according to the determination of the determination unit. The mobile communication system can therefore change the layers of the data to be transmitted to the mobile stations, depending on the condition of radio resources for the respective radio areas, even if the condition of radio resources for respective radio areas is different. Consequently, the mobile communication system can appropriately utilize radio resources.

A radio network controller according to the present invention comprises: a determination unit configured to determine as to layers of data to be transmitted by base stations to mobile stations for respective radio areas, based on area resource information; and a data transmitter configured to transmit the data to the base stations according to a determination of the determination unit.

According to the radio network controller as described above, the determination unit determines as to the layers of data to be transmitted to the mobile stations for each radio area, based on the area resource information. The data transmitter then transmits the data to the base stations according to the determination of the determination unit. The radio network controller can therefore change the layers of the data to be transmitted to the base stations, depending on the condition of radio resources for respective radio areas, even if the condition of radio resources for the respective radio areas is different. The base stations can then change the layers of the data to be transmitted to the mobile stations by transmitting the data received from the radio network controller to the mobile stations. Consequently, according to the radio network controller as described above, radio resources can be appropriately utilized.

A base station according to the present invention comprises: a determination unit configured to determine as to layers of data to be transmitted to mobile stations for respective radio areas, based on area resource information; and a radio transmitter configured to transmit the data to the mobile stations according to a determination of the determination unit.

According to the base station as described above, the determination unit determines as to the layers of data to be transmitted to the mobile stations for each radio area, based on the area resource information. The radio transmitter then transmits the data to the mobile stations according to the determination of the determination unit. The base station can therefore change the layers of the data to be transmitted to the mobile stations, depending on the condition of radio resources for respective radio areas, even if the condition of radio resources for the respective radio areas is different. Consequently, the base station can appropriately utilize radio resources.

Another base station according to the present invention comprises: a notification unit configured to notify a radio network controller of area resource information; a data receiver configured to receive data being layered for respective radio areas transmitted from the radio network controller based on the area resource information notified by the notification unit; and a radio transmitter configured to transmit the data received by the data receiver to mobile stations for the respective radio areas.

According to the base station as described above, the notification unit notifies the radio network controller of area resource information. The data receiver then receives data being layered for each radio area transmitted by the radio network controller, based on the area resource information, which the notification unit has notified. The radio transmitter transmits the data being layered, which is received by the data receiver to the mobile stations for each radio area. The base station can therefore acquire data being layered in accordance with the area resource information from the radio network controller simply by notifying the radio network controller of the area resource information of the base station. The base station can thus change the layers of the data to be transmitted to the mobile stations, depending on the condition of radio resources for respective radio areas, even if the condition of radio resources for the respective radio areas is different. Consequently, according to the base station as described above, radio resources can be appropriately utilized.

A communication method according to the present invention comprises: determining as to layers of data to be transmitted by base stations to mobile stations for respective radio areas, based on area resource information; and transmitting the data to the mobile stations according to a determination. According to the communication method as described above, the layers of the data to be transmitted to the mobile stations can be changed depending on the condition of radio resources for respective radio areas, even if the condition of radio resources for the respective radio areas is different. Consequently, radio resources can be appropriately utilized.

BRIEF DESCRIPTION OF THE SEVERAL VIEWS OF THE DRAWINGS

FIG. 4 is a diagram illustrating a necessary resource amount holding unit according to the first embodiment of the invention;

FIG. 8 is a diagram illustrating a threshold value holding unit according to the second embodiment of the invention;

DETAILED DESCRIPTION OF THE INVENTION

First Embodiment (Mobile Communication System)

Figure 1:
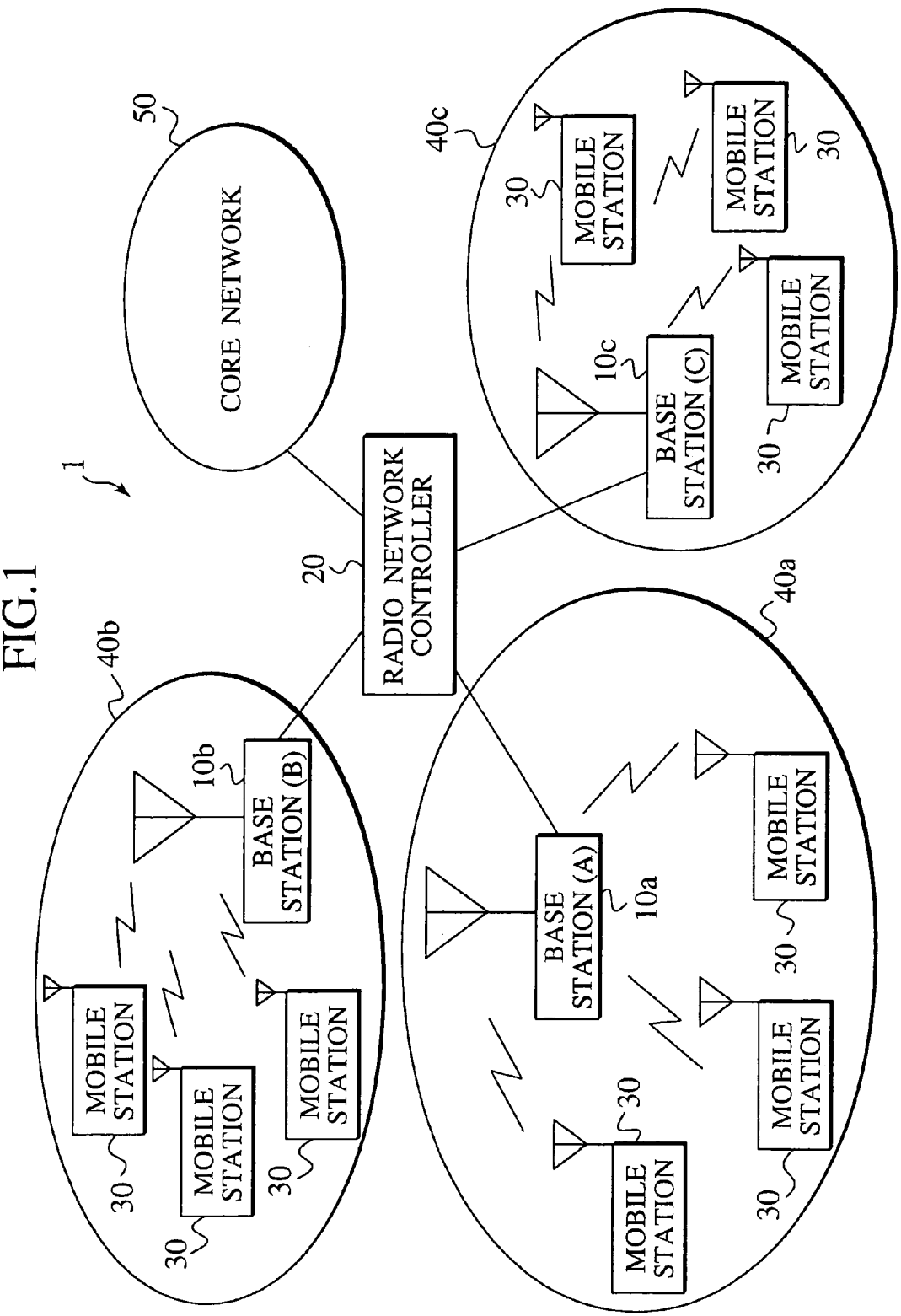
FIG. 1 is a diagram showing a configuration of a mobile communication system according to a first embodiment of the invention.

As shown in FIG. 1, the mobile communication system 1 comprises a plurality of base stations, i.e., base station (A) 10a to base station (C) 10c, a radio network controller 20, and a plurality of mobile stations 30. The radio network controller 20 is connected to a core network 50. The radio network controller 20 is also connected to the plurality of base stations, i.e., base station (A) 10a to base station (C) 10c. At the radio network controller 20, data arrives from the core network 50. The radio network controller 20 transmits the data which has arrived from the core network 50 to the subordinate base station (A) 10a to base station (C) 10c.

The plurality of base stations, i.e., base station (A) 10a to base station (C) 10c, are connected to the radio network controller 20, and placed subordinate to the radio network controller 20. The base station (A) 10a to base station (C) 10c cover radio areas 40a to 40c, respectively. The base station (A) 10a to base station (C) 10c communicate with the mobile stations 30 located in the radio areas 40a to 40c, respectively. The base station (A) 10a to base station (C) 10c receive data from the radio network controller 20, and transmit the received data to the mobile stations 30 located in the radio areas 40a to 40c covered by the respective base stations themselves.

The plurality of mobile stations 30 communicate with the plurality of base stations, i.e., base station (A) 10a to base station (C) 10c. In the present embodiment, all of the mobile stations 30 shown in FIG. 1 belong to the same multicast group. The mobile stations 30 therefore receive data common only to the mobile stations 30 belonging to the same multicast group.

Figure 2:
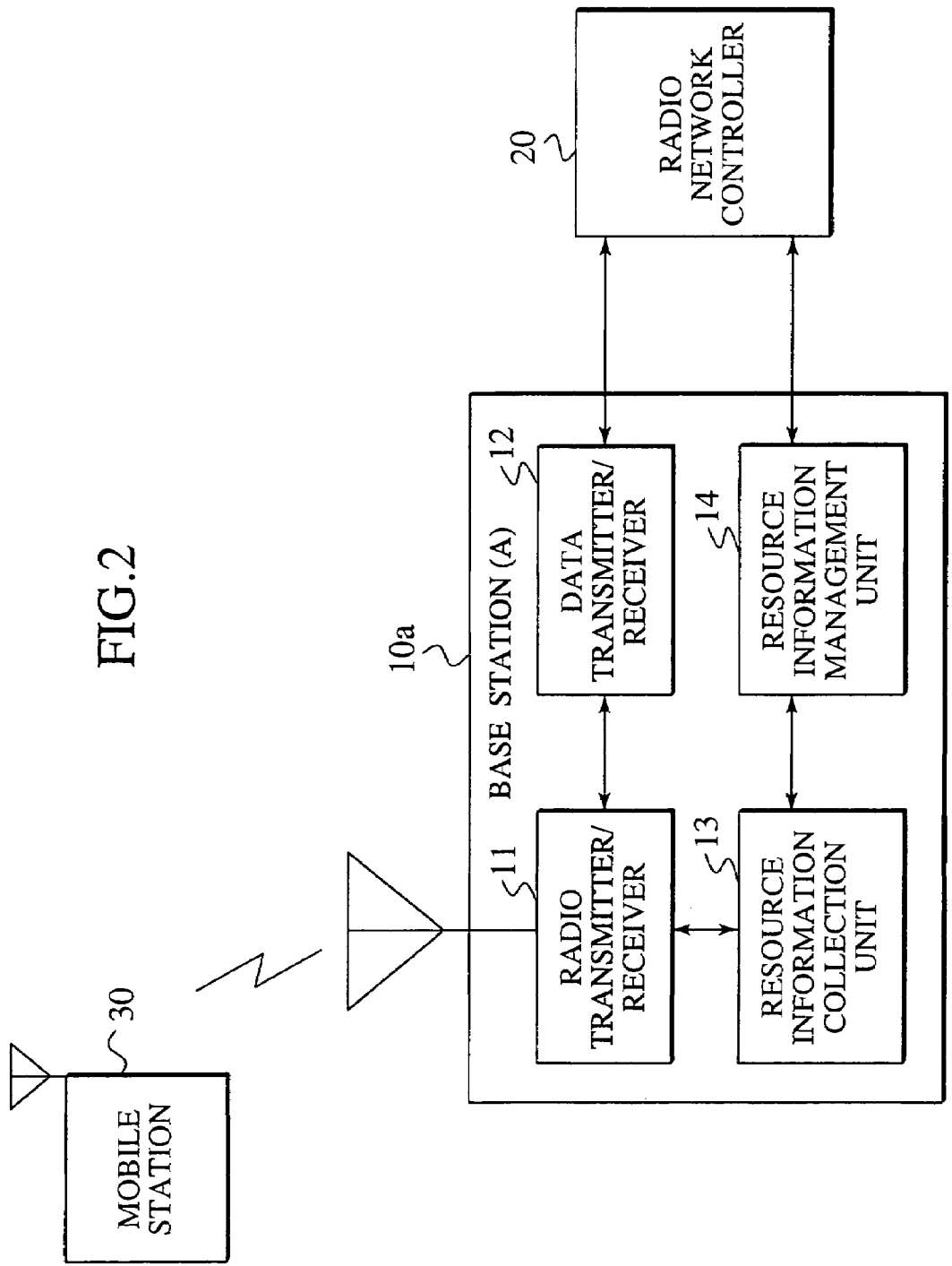
FIG. 2 is a block diagram showing a configuration of a base station according to the first embodiment of the invention.

The configuration of the base station will now be described taking the base station (A) 10a as an example. As shown in FIG. 2, the base station (A) 10a comprises a radio transmitter/receiver 11, a data transmitter/receiver 12, a resource information collection unit 13, and a resource information management unit 14. The base station (B) 10b and base station (C) 10c also have a configuration similar to that of the base station (A) 10a.

The resource information collection unit 13 collects area resource information concerning radio resources for respective radio areas covered by the base station. Since the base station (A) 10a covers one radio area 40a, the resource information collection unit 13 collects information concerning radio resources for the radio area 40a as the area resource information.

The resource information collection unit 13 collects area resource information regularly, or in response to a request from the radio network controller 20. The resource information collection unit 13 collects as the area resource information, for example, a radio resources capacity for each radio area covered by the base station and an available radio resources amount of the base station for each radio area. The resources capacity is a maximum radio resources amount of the base station. The available radio resources amount is an amount of radio resources currently available to the base station, and corresponds to radio resources currently remaining unused.

Specifically, the resource information collection unit 13 monitors the radio transmitter/receiver 11. The resource information collection unit 13 then collects area resource information by acquiring, from the radio transmitter/receiver 11, an amount of radio resources currently being used by the radio transmitter/receiver 11, an amount of radio resources currently available to the radio transmitter/receiver 11, a radio resources capacity of the radio transmitter/receiver 11 and the like for each radio area.

The resource information collection unit 13 collects radio resources amount such as the number of channels, the number of multiplexed codes and transmission power. In the embodiment, the resource information collection unit 13 collects the number of channels in the radio area 40a currently available to the base station (A) 10a, as the area resource information. The resource information collection unit 13 inputs the collected area resource information to the resource information management unit 14. The resource information collection unit 13 may acquire information concerning reception capabilities of the mobile stations 30 and information concerning propagation environments of the mobile stations 30 from the radio transmitter/receiver 11. The resource information collection unit 13 also inputs the acquired information concerning the reception capabilities and propagation environments of the mobile stations 30 to the resource information management unit 14.

The management unit 14 is a notification unit configured to notify the radio network controller 20 of the area resource information collected by the resource information collection unit 13. The resource information management unit 14 acquires the collected area resource information from the resource information collection unit 13 and notifies the radio network controller 20. The resource information management unit 14 may receive a request for resource information from the radio network controller 20. On receiving a request for resource information from the radio network controller 20, or as needed, the resource information management unit 14 can instruct the resource information collection unit 13 to collect resource information and input it. The resource information management unit 14 may acquire information concerning the reception capabilities and propagation environments of the mobile stations 30 from the resource information collection unit 13 and notify the radio network controller 20 thereof.

The data transmitter/receiver 12 transmits data to and receives data from the radio network controller 20. In particular, the data transmitter/receiver 12 functions as a data receiver configured to receive data being layered for respective radio area transmitted from the radio network controller 20 based on the area resource information notified by the resource information management unit 14. The data transmitter/receiver 12 inputs the data being layered for each radio area received from the radio network controller 20 to the radio transmitter/receiver 11. Since the base station (A) 10a covers one radio area 40a, the data transmitter/receiver 12 receives data being layered for the radio area 40a as the data being layered for each radio area.

The data being layered will be hereafter referred to as "layered data". The layered data is layered in accordance with at least one of, for example, an error coding rate, a number of repeated bits, interleave length, a number of multiplexed codes, a number of information blocks, modulation scheme, transmission power and the importance of data. The layered data may be layered in accordance with a single one of these parameters, or may be layered in accordance with a condition obtained by combining more than one of these parameters. In the embodiment, the layered data is layered according to the importance of the data. For example, moving image data is layered into three layers composed of visual data of great importance, sub-voice data of little importance, and voice data having intermediate importance between the visual data and the sub-voice data. Each of the data is divided into layer A representing the visual data, layer B representing the voice data, and layer C representing the sub-voice data.

The radio transmitter/receiver 11 transmits data to and receives data from the mobile stations 30 via radio. The radio transmitter/receiver 11 functions as a radio transmitter configured to transmit the layered data received by the data transmitter/receiver 12 to the mobile stations 30 for respective radio areas. The radio transmitter/receiver 11 acquires the layered data for each radio area transmitted from the radio network controller 20 and received by the data transmitter/receiver 12, from the data transmitter/receiver 12. Since the base station (A) 10a covers one radio area 40a, the radio transmitter/receiver 11 transmits the layered data to the mobile stations 30 located in the radio area 40a.

The radio transmitter/receiver 11 may receive information concerning the reception capabilities and information concerning the propagation environments of the mobile stations 30 from the mobile stations 30. The radio transmitter/receiver 11 inputs the received information concerning the reception capabilities and information concerning propagation environments of the mobile stations 30 to the resource information collection unit 13.

Figure 3:
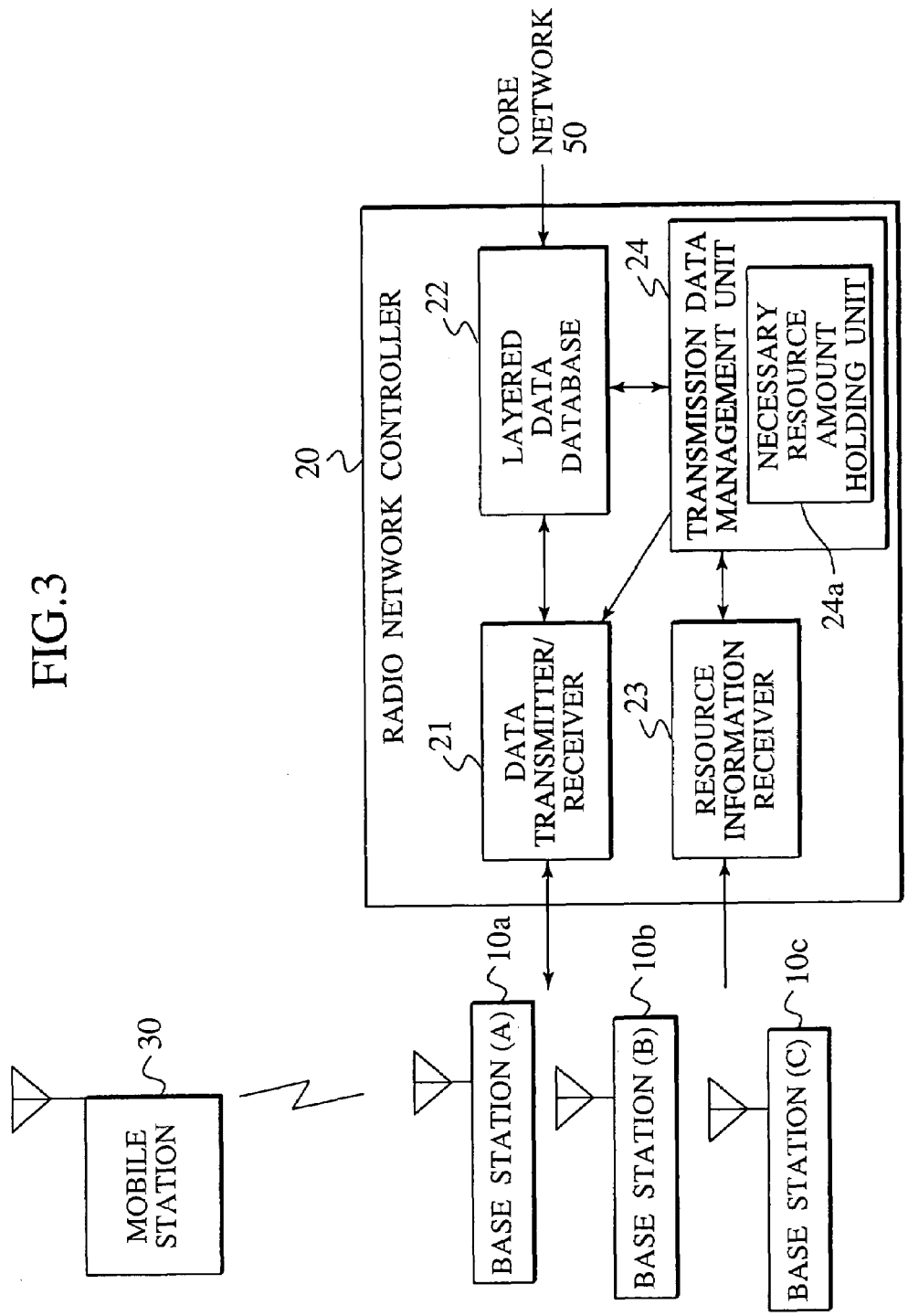
FIG. 3 is a block diagram showing a configuration of a radio network controller according to the first embodiment of the invention.

As shown in FIG. 3, the radio network controller 20 comprises a data transmitter/receiver 21, a layered data database 22, a resource information receiver 23, and a transmission data management unit 24.

The resource information receiver 23 receives area resource information collected by each of the base station (A) 10a to base station (C) 10c, from the base station (A) 10a to base station (C) 10c. The resource information receiver 23 inputs the received area resource information to the transmission data management unit 24. The resource information receiver 23 may also receive information concerning the reception capabilities and propagation environments of the mobile stations 30 and input the information to the transmission data management unit 24.

The layered data database 22 is a data holding unit for holding data. The layered data database 22 temporarily holds data for multicast, which have arrived at the radio network controller 20 from the core network 50. The layered data database 22 holds the layered data, which has been already layered. The layered data database 22 holds the layered data as divided into respective layers, i.e., layer A, layer B and layer C.

The transmission data management unit 24 is a determination unit configured to determine the layers of data to be transmitted by the base station (A) 10a to base station (C) 10c to the mobile stations 30 for respective radio areas 40a to 40c, based on the area resource information. The transmission data management unit 24 acquires area resource information of each of the base station (A) 10a to base station (C) 10c received by the resource information receiver 23, from the resource information receiver 23. The transmission data management unit 24 then determines the layers of data, based on the area resource information collected by each of the base station (A) 10a to base station (C) 10c and received by the resource information receiver 23. From among the layered data, the transmission data management unit 24 determines, for each of the radio areas 40a to 40c, one or more layers of data which each of the base station (A) 10a to base station (C) 10c transmits to the mobile stations 30.

Specifically, the transmission data management unit 24 grasps the relationship between the layers of the layered data and the radio resources amount required for transmitting the layered data. The transmission data management unit 24 comprises a necessary resource amount holding unit 24a configured to hold the radio resources amount required for transmitting the layered data in association with the layers of the layered data. FIG. 4 shows the necessary resource amount holding unit 24a. The necessary resource amount holding unit 24a holds the number of channels required for transmitting the layered data in association with each of the layers A to C. As shown in FIG. 4, transmission of visual data of the layer A requires five channels, transmission of voice data of the layer B requires ten channels, and transmission of sub-voice data of the layer C requires fifteen channels.

The transmission data management unit 24 then reads the layered data from the layered data database 22. The transmission data management unit 24 refers to the area resource information received from each of the base station (A) 10a to base station (C) 10c, the read layered data, and the radio resources amount required for transmitting the layered data held in the necessary resource amount holding unit 24a, and uses them as a basis to determine the layers of the data to be transmitted to the mobile stations 30 for each of the radio areas 40a to 40c. Specifically, the transmission data management unit 24 acquires the radio resources amount required for transmitting each layered data from the necessary resource amount holding unit 24a, based on the type of the read layered data. The transmission data management unit 24 then compares the radio resources capacity for each of the radio areas 40a to 40c and the radio resources amount currently available for each radio area with the radio resources amount required for transmitting each layered data to determine the layers of the data to be transmitted to the mobile stations 30 for each radio area.

Suppose, for example, the resource information receiver 23 has received area resource information from the base station (A) 10a that the number of channels currently available in the radio area 40a is forty channels, from the base station (B) 10b that the number of channels currently available in the radio area 40b is fifteen channels, and from the base station (C) 10c that the number of channels currently available in the radio area 40c is twenty-five channels. In this case, the transmission data management unit 24 compares the number of channels currently available for each of the radio areas 40a to 40c with the number of channels required for transmitting each layered data. And the transmission data management unit 24 determines the layers of the data to be transmitted to the mobile stations 30 located in the radio area 40a as being layer A, layer B and layer C, the layers of the data to be transmitted to the mobile stations 30 located in the radio area 40b as being layer A alone, and the layers of the data to be transmitted to the mobile stations 30 located in the radio area 40c as being layer A and layer B. The transmission data management unit 24 then determines to transmit the layered data of layer A, layer B and layer C to the base station (A) 10a, the layered data of layer A to the base station (B) 10b, and the layered data of layer A and layer B to the base station (C) 10c.

In addition, the transmission data management unit 24 may also determine the layer based on the reception capabilities and propagation environments of the mobile stations 30. For example, the transmission data management unit 24 also acquires information concerning the reception capabilities and propagation environments of the mobile stations 30 from the resource information receiver 23. The transmission data management unit 24 may also then determine the layers of the layered data based on the acquired information concerning the reception capabilities and information concerning the propagation environments of the mobile stations 30. The reception capabilities of the mobile stations 30 include, for example, the modulation scheme used by the mobile stations 30.

The transmission data management unit 24 inputs the determination information concerning the determined layers of the layered data to be transmitted to each of the base station (A) 10a to base station (C) 10c, to the data transmitter/receiver 21. The transmission data management unit 24 may also request a notice of area resource information from each of the base station (A) 10a to base station (C) 10c, if the area resource information is required. The transmission data management unit 24 then inputs a request for notice of area resource information to the data transmitter/receiver 21.

The data transmitter/receiver 21 transmits data to and receives data from the base station (A) 10a to base station (C) 10c. In particular, the data transmitter/receiver 21 functions as a data transmitter configured to transmit data to the base station (A) 10a to base station (C) 10c according to the determination of the transmission data management unit 24. The data transmitter/receiver 21 transmits the layered data of the layers determined by the transmission data management unit 24 to the base station (A) 10a to base station (C) 10c. The data transmitter/receiver 21 acquires the determination information from the transmission data management unit 24. Based on the acquired determination information, the data transmitter/receiver 21 acquires the layered data to be transmitted to the base station (A) 10a to base station (C) 10c from the layered data database 22. The data transmitter/receiver 21 transmits the acquired layered data to the base station (A) 10a to base station (C) 10c according to the determination information.

The data transmitter/receiver 21 transmits the layered data of layer A, layer B and layer C to the base station (A) 10a, the layered data of layer A to the base station (B) 10b, and the layered data of layer A and layer B to the base station (C) 10c. The data transmitter/receiver 21 may acquire a request for notice of area resource information from the transmission data management unit 24 and transmit a request for notice of the area resource information to each of the base station (A) 10a to base station (C) 10c.

(Communication Method)

Figure 5:
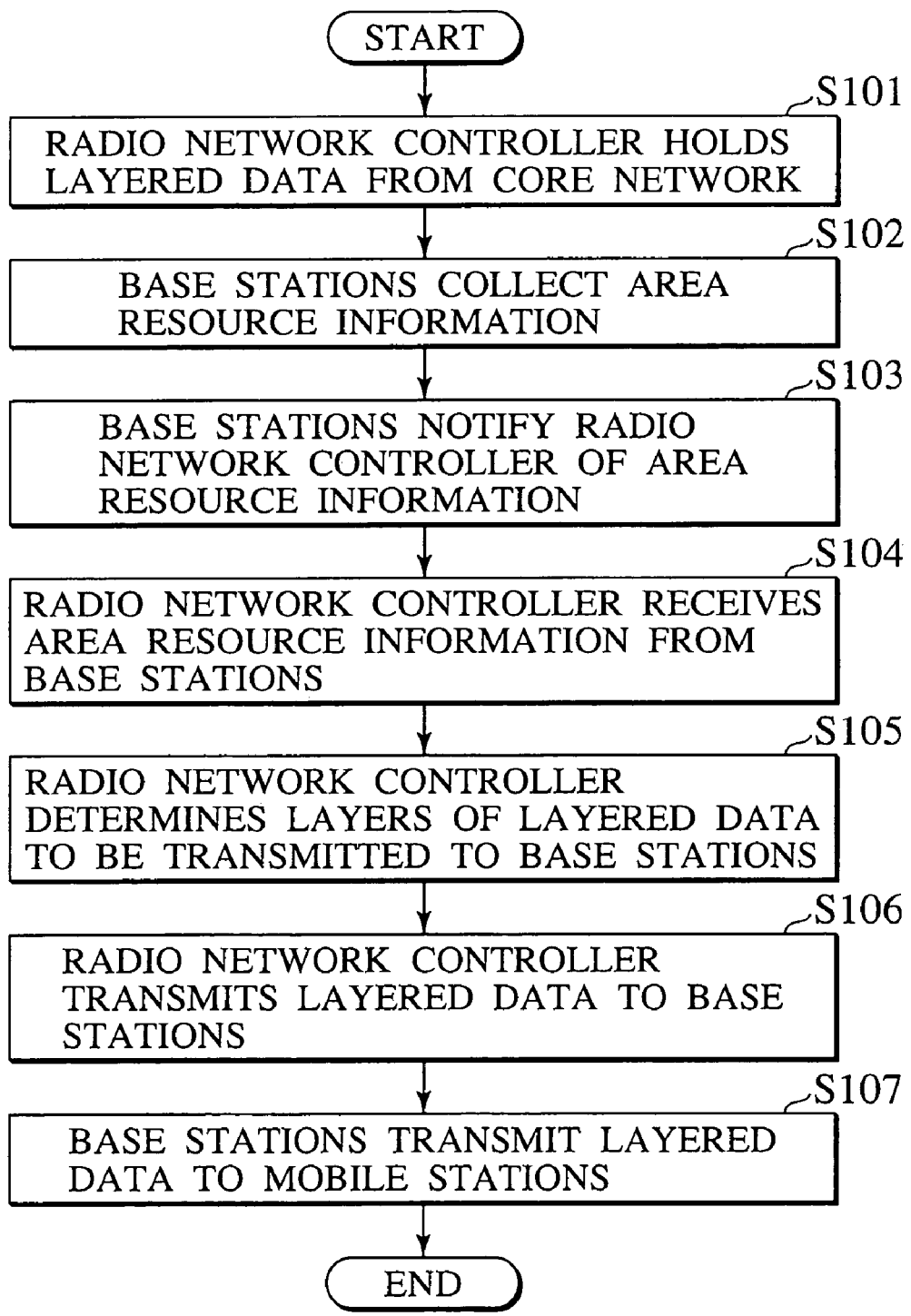
FIG. 5 is a flow diagram showing a procedure of a communication method according to the first embodiment of the invention.

The procedure of the communication method performed by using the mobile communication system 1 will now be described. As shown in FIG. 5, the layered data first arrive at the radio network controller 20 from the core network 50. The radio network controller 20 stores and holds the arrived layered data in the layered data database 22 (S101). The resource information collection unit 13 in each of the base station (A) 10a to base station (C) 10c collects area resource information (S102). The resource information management unit 14 in each of the base station (A) 10a to base station (C) 10c acquires the collected area resource information from the resource information collection unit 13 and notifies the radio network controller 20 thereof (S103).

The resource information receiver 23 in the radio network controller 20 receives the area resource information from each of the subordinate base station (A) 10a to base station (C) 10c (S104). The transmission data management unit 24 in the radio network controller 20 reads the layered data from the layered data database 22. The transmission data management unit 24 then refers to the area resource information received from each of the base station (A) 10a to base station (C) 10c, the layered data which have been read, and the necessary radio resources amount required for transmitting the layered data held in the necessary resource amount holding unit 24a, and uses them as a basis to determine the layers of the data to be transmitted to the mobile stations 30 for each of the radio areas 40a to 40c. The transmission data management unit 24 then determines the layers of the layered data to be transmitted to each of the base station (A) 10a to base station (C) 10c (S105).

The data transmitter/receiver 21 in the radio network controller 20 acquires the layered data from the layered data database 22, based on the determination information acquired from the transmission data management unit 24, and transmits the acquired layered data to each of the base station (A) 10a to base station (C) 10c (S106). Subsequently, the data transmitter/receiver 12 in each of the base station (A) 10a to base station (C) 10c receives the layered data. Finally, the radio transmitter/receiver 11 in each of the base station (A) 1a to base station (C) 10c transmits the layered data transmitted from the radio network controller 20 to the mobile stations 30 for each of the radio areas 40a to 40c (S107).

According to the mobile communication system 1, radio network controller 20, base station (A) 10a to base station (C) 10c, and communication method as described above, the transmission data management unit 24 in the radio network controller 20 determines for each of the radio areas 40a to 40c as to the layers of data which the base station (A) 10a to base station (C) 10c transmit to the mobile stations 30, based on the area resource information. The radio transmitter/receiver 11 in the base station (A) 10a to base station (C) 10c then transmits the data to the mobile stations 30 according to the determination of the transmission data management unit 24.

The mobile communication system 1, radio network controller 20, and base station (A) 10a to base station (C) 10c can therefore change the layers of the data to be transmitted to the mobile stations 30, depending on the condition of radio resources for respective radio areas, even if the condition of radio resources for the respective radio areas 40a to 40c is different. Consequently, the mobile communication system 1, radio network controller 20, and base station (A) 10a to base station (C) 10c can appropriately utilize radio resources.

In particular, when transmitting data for multicast common to a plurality of mobile stations 30 belonging to a specific multicast group like simultaneous transmission or broadcast-type communication, the mobile communication system 1, radio network controller 20, and base station (A) 10a to base station (C) 10c can change layers of the data for multicast to be transmitted to the mobile stations 30 depending on the condition of radio resources for respective radio areas, and can thus appropriately utilize radio resources.

For example, the mobile communication system 1, radio network controller 20, and base station (A) 10a to base station (C) 10c can avoid pressure on the traffic of communication and failure of data transmission other than the data for multicast when transmitting data to the mobile stations 30 located in a radio area having a small amount of radio resources, and can make maximal use of radio resources when transmitting data to the mobile stations 30 located in a radio area having a great amount of radio resources.

Furthermore, the transmission data management unit 24 determines the layers of the data to be transmitted from among the layered data, and the radio transmitter/receiver 11 then transmits the data of the determined layers to the mobile stations 30. The mobile communication system 1, radio network controller 20, and base station (A) 10a to base station (C) 10c can therefore change the layers of the data to be transmitted to the mobile stations 30 depending on the condition of radio resources for respective radio areas when the data has already been layered.

Moreover, the resource information management unit 14 in the base station (A) 10a to base station (C) 10c notifies the radio network controller 20 of area resource information. The resource information receiver 23 in the radio network controller 20 receives the area resource information from the base station (A) 10a to base station (C) 10c. The transmission data management unit 24 in the radio network controller 20 then determines for each radio area as to the layers of the data to be transmitted to the mobile stations 30, based on the area resource information of which the transmission data management unit 24 has been notified. The data transmitter/receiver 21 in the radio network controller 20 transmits the layered data to the base station (A) 10a to base station (C) 10c according to the determination of the transmission data management unit 24. The data transmitter/receiver 12 in the base station (A) 10a to base station (C) 10c receives the layered data for each radio area which the radio network controller 20 has transmitted based on the area resource information of which the resource information management unit 14 has notified. The radio transmitter/receiver 11 in the base station (A) 10a to base station (C) 10c then transmits the layered data received by the data transmitter/receiver 12 to the mobile stations 30 for the respective radio areas 40a to 40c. In this manner, the radio transmitter/receiver 11 functions as a radio transmitter configured to transmit the layered data to the mobile stations 30 according to the determination of the transmission data management unit 24.

The radio network controller 20 can therefore change the layers of the data to be transmitted to the base station (A) 10a to base station (C) 10c depending on the condition of radio resources for respective radio areas, even if the condition of radio resources for the respective radio areas is different. The base station (A) 10a to base station (C) 10c can then change the layers of the data to be transmitted to the mobile stations 30 by transmitting the data received from the radio network controller 20 to the mobile stations 30.

The base station (A) 10a to base station (C) 10c can acquire the layered data depending on the area resource information from the radio network controller 20 simply by notifying the radio network controller 20 of the area resource information. The base station (A) 10a to base station (C) 10c can thus change the layers of the data to be transmitted to the mobile stations 30 depending on the condition of radio resources for respective radio areas, even if the condition of radio resources for the respective radio areas is different. In addition, control load can be distributed because the base station (A) 10a to base station (C) 10c collect the area resource information and the radio network controller 20 determines as to the layers of the data to be transmitted.

Furthermore, the base station (A) 10a to base station (C) 10c comprises the resource information collection unit 13 configured to collect area resource information, and the resource information management unit 14 notifies the radio network controller 20 of the collected area resource information. The transmission data management unit 24 in the radio network controller 20 determines based on the area resource information collected by the resource information collection unit 13 in the base station (A) 10a to base station (C) 10c and received by the resource information receiver 23 in the radio network controller 20.

The base station (A) 10a to base station (C) 10c can therefore collect current area resource information and notify the radio network controller 20 thereof. The radio network controller 20 can acquire current area resource information and change the layers of the data to be transmitted to the mobile stations 30 depending on the current condition of radio resources for respective radio areas. The base station (A) 10a to base station (C) 10c can then receive the data of the layers changed depending on the current condition of radio resources for the respective radio areas. The mobile communication system 1, radio network controller 20, and base station (A) 10a to base station (C) 10c can therefore more appropriately utilize radio resources.

Second Embodiment (Mobile Communication System)

Figure 6:
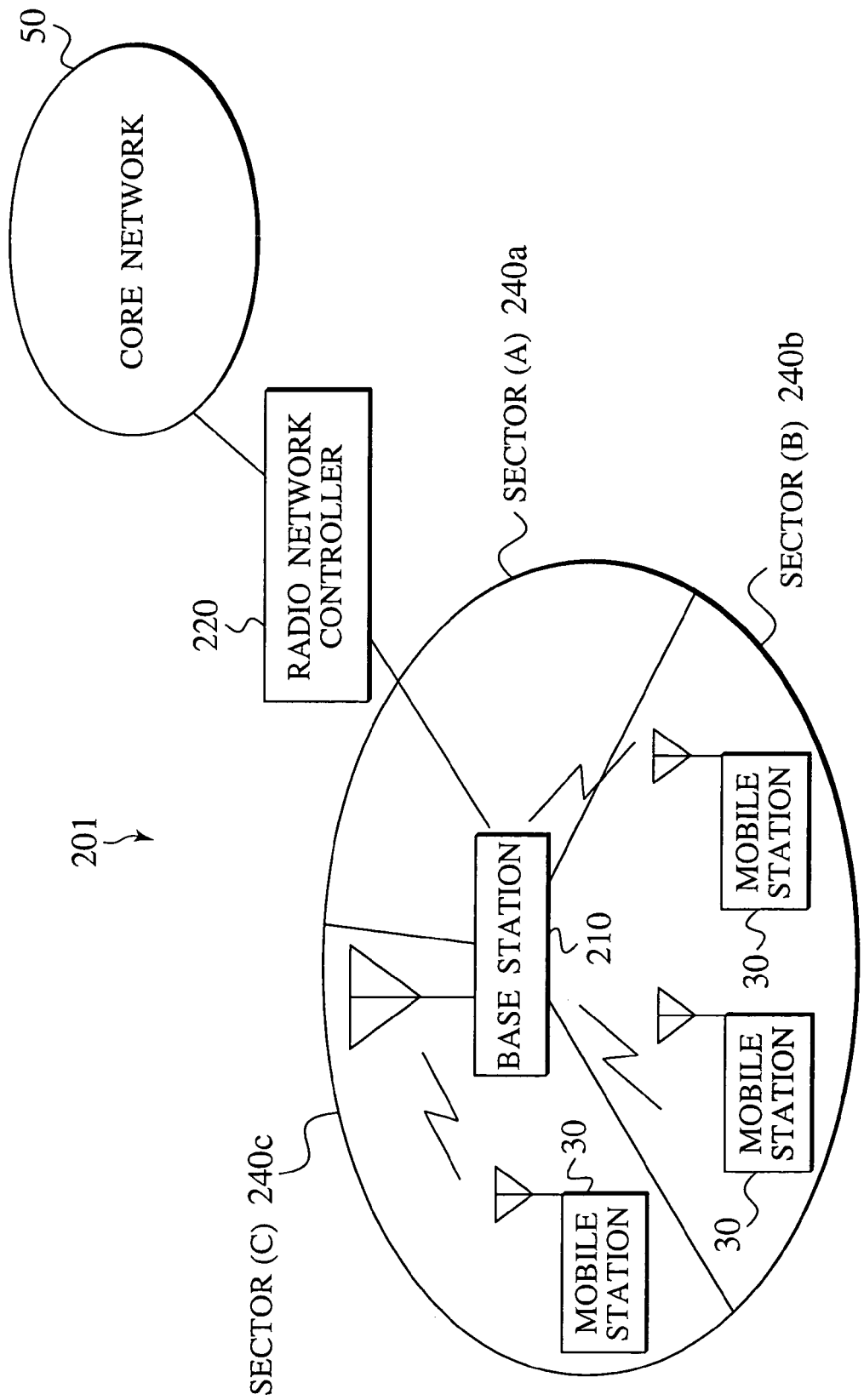
FIG. 6 is a diagram showing a configuration of a mobile communication system according to a second embodiment of the invention.

As shown in FIG. 6, the mobile communication system 201 comprises a base station 210, a radio network controller 220, and a plurality of mobile stations 30. The radio network controller 220 is connected to a core network 50. The radio network controller 220 is also connected to the base station 210. In the present embodiment, one base station is placed subordinate to the radio network controller 220. The radio network controller 220 transmits data, which have arrived from the core network 50 to the subordinate base station 210.

The base station 210 is connected to the radio network controller 220, and placed subordinate to the radio network controller 220. The base station 210 covers a plurality of radio areas. When a radio area covered by one base station 210 is divided into a plurality of radio areas, each of the divided radio areas is referred to as a sector. The base station 210 covers sector (A) 240a to sector (C) 240c. The base station 210 communicates with mobile stations 30 located in the sector (A) 240a to sector (C) 240c. The base station 210 receives data from the radio network controller 220, and transmits the received data to the mobile stations 30 located in the sector (A) 240a to sector (C) 240c covered by the base station 210 itself. The plurality of mobile stations 30 communicate with the base station 210. In the embodiment, all of the mobile stations 30 shown in FIG. 6 belong to the same multicast group.

Figure 7:
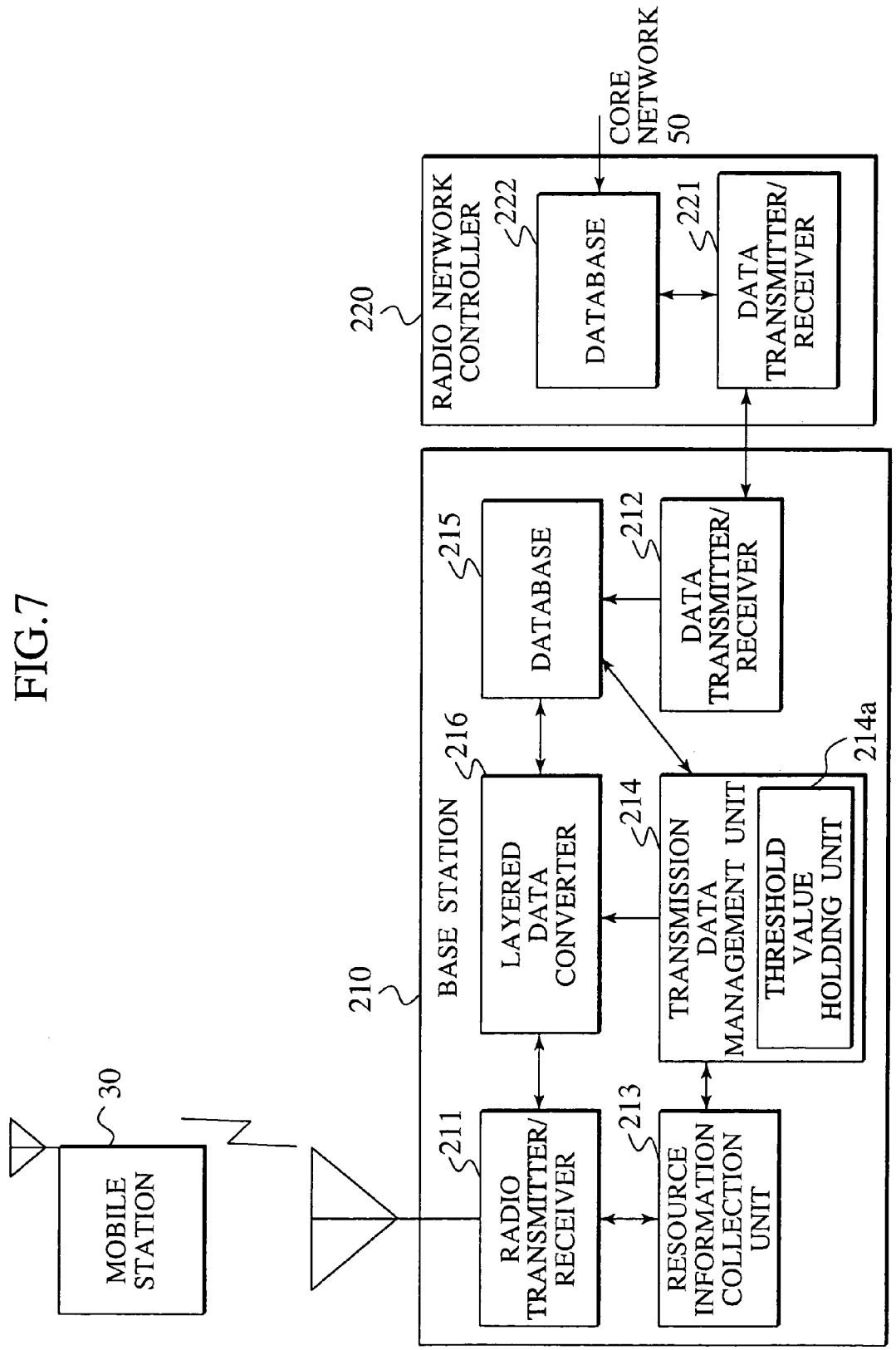
FIG. 7 is a block diagram showing a configuration of a base station and a radio network controller according to the second embodiment of the invention.

As shown in FIG. 7, the base station 210 comprises a radio transmitter/receiver 211, a data transmitter/receiver 212, a resource information collection unit 213, a transmission data management unit 214, a database 215, and a layered data converter 216.

The data transmitter/receiver 212 transmits data to and receives data from the radio network controller 220. The data transmitter/receiver 212 receives, from the radio network controller 220, data for multicast, which have arrived at the radio network controller 220 from the core network 50 in a non-layered form. The data transmitter/receiver 212 stores the data received from the radio network controller 220 in the database 215. The data transmitter/receiver 212 may request transmission of data to the radio network controller 220. The database 215 is a data holding unit for holding data. The database 215 temporarily holds data for multicast received from the radio network controller 220. The database 215 holds non-layered data.

The resource information collection unit 213 collects area resource information concerning radio resources for each of the sector (A) 240a to sector (C) 240c covered by the base station 210. The resource information collection unit 213 collects area resource information regularly, or in response to a request from the transmission data management unit 214. In the embodiment, the resource information collection unit 213 collects information concerning the number of multiplexed codes and transmission power for each of the sector (A) 240a to sector (C) 240c, which are currently available to the base station 210, as the area resource information. Information concerning transmission power includes the currently available transmission power value and the proportion of currently available transmission power to the total transmission power of the base station 210. The resource information collection unit 213 inputs the collected area resource information to the transmission data management unit 214.

The resource information collection unit 213 may acquire from the radio transmitter/receiver 211 information concerning the reception capabilities and information concerning the propagation environments of the mobile stations 30. The resource information collection unit 213 also inputs the acquired information concerning the reception capabilities and information concerning the propagation environments of the mobile stations 30 to the transmission data management unit 214. Except for these points, the resource information collection unit 213 is substantially the same as the resource information collection unit 13 shown in FIG. 2.

The transmission data management unit 214 is a determination unit configured to determine as to the layers of data, which the base station 210 transmits to the mobile stations 30 for respective sector (A) 240a to sector (C) 240c, based on the area resource information. The transmission data management unit 214 acquires the area resource information of the base station 210 collected by the resource information collection unit 213 from the resource information collection unit 213. The transmission data management unit 214 then determines layering methods for layering the data to be transmitted to the mobile stations 30, based on the area resource information collected by the resource information collection unit 213.

The transmission data management unit 214 can use layering methods for layering data using at least one of, for example, error coding rate, the number of repeated bits, interleave length, the number of multiplexed codes, the number of information blocks, modulation scheme, transmission power and the importance of data, in order to determine the layering method. The transmission data management unit 214 may use a single one of these parameters to layer the data, or may use more than one of these parameters to layer the data. When layering the data by the modulation scheme, the transmission data management unit 214 layers the data by the type of modulation schemes including multi-level QAMs such as 16QAM (Quadrature Amplitude Modulation), 64QAM, 128QAM and 256QAM, and multi-phase PSKs such as QPSK (Quadrature Phase Shift Keying) and BPSK (Binary Phase Shift Keying).

Specifically, the transmission data management unit 214 acquires the collected area resource information from the resource information collection unit 213. On the other hand, the transmission data management unit 214 grasps the relationship between the layering methods and threshold values for layering. The threshold value for layering refers to a minimum radio resources amount required for layering by a given layering method. The transmission data management unit 214 comprises a threshold value holding unit 214a configured to hold threshold values for layering in association with the layering methods.

FIG. 8 shows the threshold value holding unit 214a. The threshold value holding unit 214a holds threshold values for layering for the respective layering methods in association with the layering methods. As shown in FIG. 8, the threshold value for layering for the layering method which performs layering using the number of multiplexed codes is greater than or equal to 20 codes, and the threshold value for layering for the layering method which performs layering using the transmission power is greater than or equal to 40% of the total transmission power of the base station 210. The threshold value for layering can be set arbitrarily.

The transmission data management unit 214 then refers to the area resource information received from the resource information collection unit 213 and the threshold value for layering held in the threshold value holding unit 214a, and uses them as a basis to determine the layering methods for the data to be transmitted to the mobile stations 30 for each of the sector (A) 240a to sector (C) 240c. The transmission data management unit 214 compares the radio resources capacity for each of the sector (A) 240a to sector (C) 240c and the radio resources amount currently available for each of the sector (A) 240a to sector (C) 240c with the threshold value for layering for each layering method to determine the layering method for data for each of the sector (A) 240a to sector (C) 240c.

The transmission data management unit 214 may also read data from the database 215 and determine the layering methods based on the amount of the data and the type of the data. The transmission data management unit 214 may also determine the layering methods based on the information concerning the reception capabilities and information concerning the propagation environments of the mobile stations 30. For example, the transmission data management unit 214 also acquires the information concerning the reception capabilities and information concerning the propagation environments of the mobile stations 30 from the resource information collection unit 213. The transmission data management unit 214 may then also determine the layering methods based on the acquired information concerning the reception capabilities and information concerning the propagation environments of the mobile stations 30.

Suppose, for example, the transmission data management unit 214 has acquired area resource information that the sector (A) 240*a* has a currently available number of multiplexed codes being 40 and currently available transmission power being 10% of the total transmission power of the base station 210, the sector (B) 240*b* has a currently available number of multiplexed codes being 15 and currently available transmission power being 40% of the total transmission power of the base station 210, and the sector (C) 240*c* has a currently available number of multiplexed codes being 20 and currently available transmission power being 60% of the total transmission power of the base station 210, from the resource information collection unit 213.

In this case, the transmission data management unit 214 determines the layering method for the data to be transmitted to the mobile stations 30 located in the sector (A) 240*a* as being the layering method by the number of multiplexed codes because the sector (A) 240*a* has a greater number of available multiplexed codes but smaller available transmission power than the sector (B) 240*b* and sector (C) 240*c*. The transmission data management unit 214 determines the layering method for the data to be transmitted to the mobile stations 30 located in the sector (B) 240*b* and sector. (C) 240*c* as being the layering method by the transmission power because the sector (B) 240*b* and sector (C) 240*c* have greater available transmission power but a smaller number of available multiplexed codes than the sector (A) 240*a*. The transmission data management unit 24 inputs the determined layering method for each of the sector (A) 240*a* to sector (C) 240*c* to the layered data converter 216.

The layered data converter 216 layers the data for the respective radio areas using the layering methods determined by the transmission data management unit 214. The layered data converter 216 acquires the determined layering methods from the transmission data management unit 214. The layered data converter 216 reads data from the database 215. The layered data converter 216 layers the read data for each of the sector (A) 240*a* to sector (C) 240*c* to form layered data, by the layering method acquired from the transmission data management unit 214. The layered data converter 216 inputs the layered data, which has been layered to the radio transmitter/receiver 211. The layered data converter 216 may input the layered data in response to a request from the radio transmitter/receiver 211.

The radio transmitter/receiver 211 functions as a radio transmitter configured to transmit data to the mobile stations 30 according to the determination of the transmission data management unit 214. The radio transmitter/receiver 211 acquires the layered data for each of the sector (A) 240*a* to sector (C) 240*c*, which the layered data converter 216 has layered. The radio transmitter/receiver 211 transmits the layered data for each of the sector (A) 240*a* to sector (C) 240*c* to the mobile stations 30 located in each of the sector (A) 240*a* to sector (C) 240*c*, respectively. The radio transmitter/receiver 211 may receive information concerning the reception capabilities and information concerning the propagation environments of the mobile stations 30 from the mobile stations 30. The radio transmitter/receiver 211 then inputs the received information concerning the reception capabilities and information concerning the propagation environments of the mobile stations 30 to the resource information collection unit 213.

As shown in FIG. 7, the radio network controller 220 comprises a data transmitter/receiver 221 and a database 222. The database 222 temporarily holds data for multicast, which has arrived at the radio network controller 220 from the core network 50. The database 222 holds non-layered data.

The data transmitter/receiver 221 transmits data to and receives data from the base station 210. The data transmitter/receiver 221 acquires the data to be transmitted to the base station 210 from the database 222. The data transmitter/receiver 221 transmits the acquired data to the base station 210. The data transmitter/receiver 221 may transmit data in response to a request from the base station 210, may transmit data on arrival of the data from the core network 50, or may transmit data at regular intervals.

(Communication Method)

Figure 9:
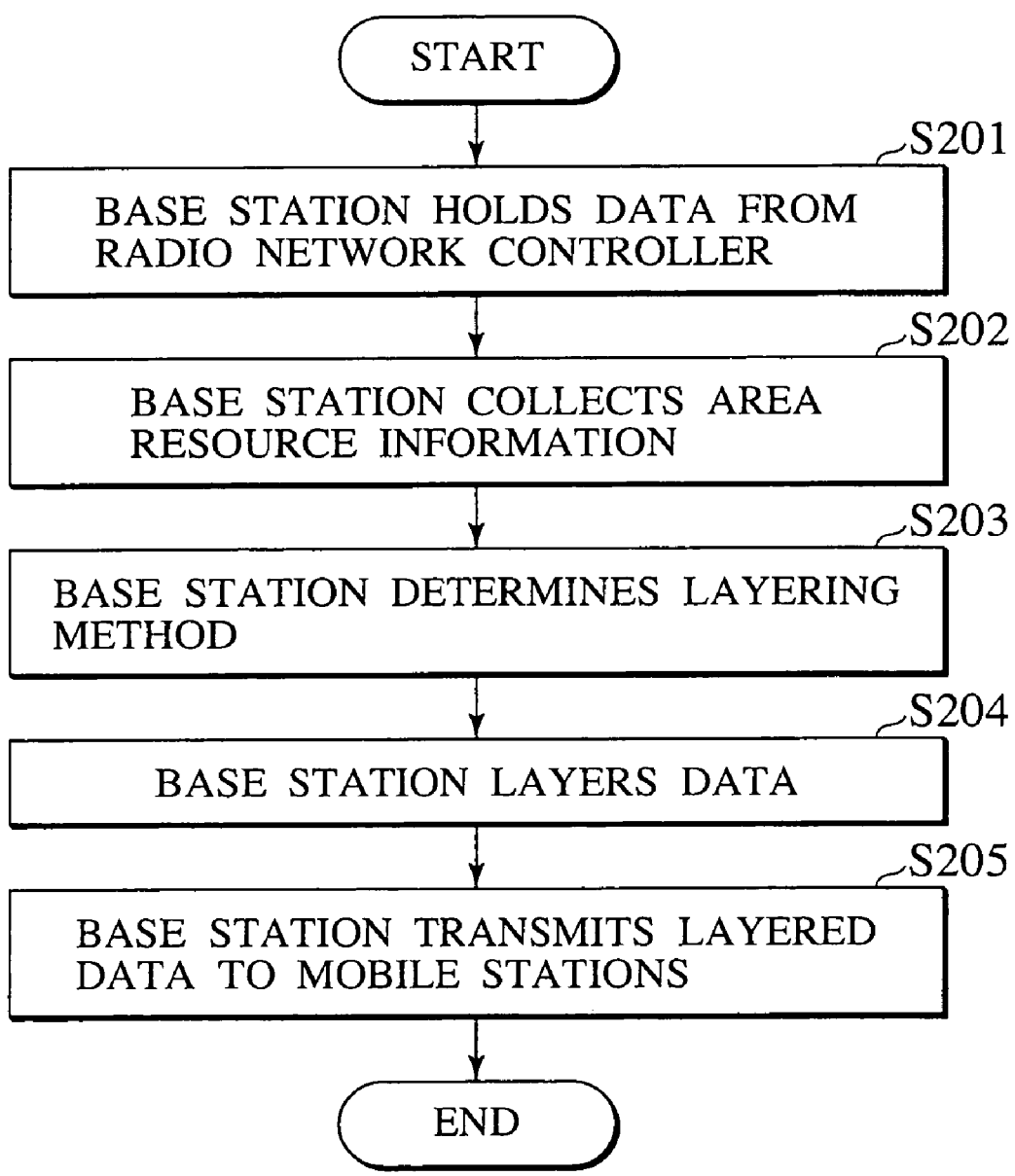
FIG. 9 is a flow diagram showing a procedure of a communication method according to the second embodiment of the invention.

The procedure of the communication method performed by using the mobile communication system 201 will now be described. As shown in FIG. 9, the data transmitter/receiver 221 in the radio network controller 220 first transmits non-layered data to the base station 210. The data transmitter/receiver 212 in the base station 210 receives the data transmitted from the radio network controller 220 and stores the data in the database 215. In this manner, the base station 210 holds the data (S201). The resource information collection unit 213 in the base station 210 collects area resource information (S202).

The transmission data management unit 214 in the base station 210 acquires the collected area resource information from the resource information collection unit 213. The transmission data management unit 214 refers to the threshold values for layering held in the threshold value holding unit 214*a*. And the transmission data management unit 214 determines the layering method for the data to be transmitted to the mobile stations 30 for each of the sector (A) 240*a* to sector (C) 240*c*, based on the acquired area resource information and referred the threshold values for layering (S203).

The layered data converter 216 reads data from the database 215 and layers the data for each of the sector (A) 240*a* to sector (C) 240*c* using the layering method determined by the transmission data management unit 214 (S204). Finally, the radio transmitter/receiver 211 transmits the layered data converted by the layered data converter 216 to the mobile stations 30 for each of the sector (A) 240*a* to sector (C) 240*c* (S205).

According to the mobile communication system 201, base station 210, and communication method as described above, the transmission data management unit 214 in the base station 210 determines the layering methods for layering data. The layered data converter 216 layers data for the respective sector (A) 240*a* to sector (C) 240*c* by the layering method determined by the transmission data management unit 214. The radio transmitter/receiver 211 then transmits the data layered by the layered data converter 216 using the layering methods determined by the transmission data management unit 214 to the mobile stations 30, thereby transmitting the data according to the determination of the transmission data management unit 214.

The mobile communication system 201 and base station 210 can therefore change the layering methods depending on the area resource information, layer the data by the layering methods, and transmit the layered data to the mobile stations 30. The mobile communication system 201 and base station 210 can thus change the layers of the data to be transmitted to the mobile stations 30 depending on the condition of radio resources for each of the sector (A) 240a to sector (C) 240c, even if the data has not been layered.

Furthermore, the base station 210 comprises the transmission data management unit 214 and radio transmitter/receiver 211. As a result, the transmission data management unit 214 in the base station 210 determines for each radio area as to the layers of the data to be transmitted to the mobile stations 30 based on the area resource information. The radio transmitter/receiver 211 then transmits the data to the mobile stations 30 according to the determination of the transmission data management unit 214. The base station 210 itself can therefore change the layers of the data to be transmitted to the mobile stations 30 depending on the condition of radio resources for each radio area, even if the condition of radio resources for the respective radio areas is different. Moreover, since the base station 210 need not notify the radio network controller 220 of the area resource information, the traffic between the base station 210 and the radio network controller 220 can be reduced.

[Variations]

The invention is not limited to the embodiments described above, and various variations are possible. As the area resource information, the information concerning the layers determined by the transmission data management unit 24, 214 may be used. The information concerning the layers determined by the transmission data management unit 24, 214 includes the information concerning the layers of the layered data, which the transmission data management unit 24, 214 has determined to transmit, and the information concerning the determined layering methods for the data. Since the determined layers and layering methods influence the amount of the remaining available radio resources, they can be used as the area resource information. In this case, with regard to the data to be transmitted to the radio area in question, the transmission data management unit 24, 214 can further determine the layers of the layered data and the layering methods for the data, based on the layers of the layered data which have already been determined to be transmitted, and on the already determined layering methods for the data.

The radio network controller 20 shown in FIG. 3 may comprise the transmission data management unit 214 and database 215 of the base station 210 shown in FIG. 7 instead of the transmission data management unit 24 and layered data database 22, and additionally comprise the layered data converter 216. The radio network controller 20 may then be configured, like the base station 210, to determine the layering methods, layer the data, and transmit the layered data to the base station. In this case, the layered data converter 216 inputs the layered data which it has layered to the data transmitter/receiver 21, and the data transmitter/receiver 21 in turn transmits the layered data acquired from the layered data converter 216 to the base station.

The base station 210 shown in FIG. 7 may comprise the transmission data management unit 24 and layered data database 22 of the radio network controller 20 shown in FIG. 3 instead of the transmission data management unit 214 and database 215. The base station 210 may then be configured, like the radio network controller 20, to determine the layers of the data to be transmitted, and transmit the data to the mobile stations 30. In this case, the layered data converter 216 is not required. In addition, the radio transmitter/receiver 211 acquires the determination information from the transmission data management unit 24, reads the layered data from the layered data database 22 and transmits the layered data to the mobile stations 30.

The resource information collection units 13 and 213 and the resource information management unit 14 shown in FIGS. 2 and 7, and the resource information receiver 23 shown in FIG. 3 need not necessarily be provided. In this case, the transmission data management unit 24, 214 can, for example, hold in advance the area resource information such as the radio resources capacity for each radio area covered by the base station, and based on that area resource information, determine as to the layers of the data to be transmitted.

Figure 10:
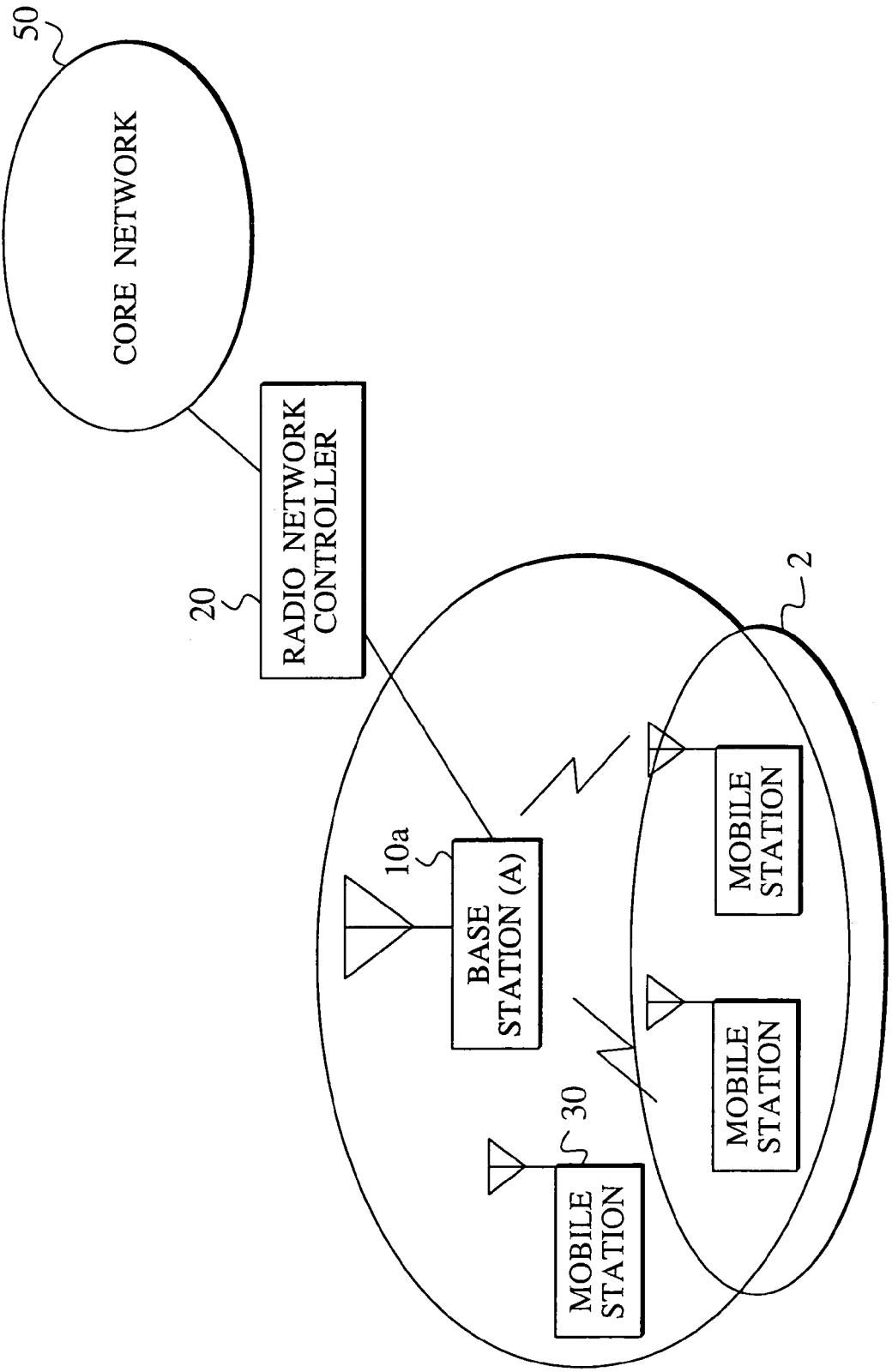
FIG. 10 is a diagram showing a configuration of a mobile communication system according to a variation of the invention.

The number of base stations connected to the radio network controller 20 and placed subordinate to the radio network controller 20 may be more than one, or may be one. The number of mobile stations 30 communicating with one base station may be more than one, or may be one. Furthermore, as shown in FIG. 10, only a portion of the plurality of mobile stations 30 may be configured to belong to the same multicast group 2. In this case, the mobile stations 30 belonging to the multicast group 2 may receive the data common only to the mobile stations 30 belonging to the multicast group 2.

While in FIG. 3 the transmission data management unit 24 comprises the necessary resource amount holding unit 24a, it is not limited; the radio network controller 20 may comprise the necessary resource amount holding unit 24a. Furthermore, while in FIG. 7 the transmission data management unit 214 comprises the threshold value holding unit 214a, it is not limited; the base station 210 may comprise the threshold value holding unit 214a.

What is claimed is:

1. A mobile communication system comprising:
   a holding unit configured to hold layered data and a corresponding radio resource amount indicating at least one of a number of channels, a number of multiplexed codes or a transmission power required for transmitting the layered data;
   a determination unit configured to compare area resource information indicating at least one of an available number of channels, an available number of multiplexed codes or an available transmission power for respective radio areas covered by base stations with the radio resource amount held in the holding unit for each of a plurality of layers of the layered data, and to determine, from layered data of a highest layer, at least one layered data of which the radio resource held in the holding unit satisfies the area resource information; and
   a radio transmitter configured to transmit the at least one layered data determined by the determination unit from the base station to the mobile stations.

2. A radio network controller comprising:
   a holding unit configured to hold layered data and a corresponding radio resource amount indicating at least one of a number of channels, a number of multiplexed codes or a transmission power required for transmitting the layered data;
   a determination unit configured to compare area resource information indicating at least one of an available number of channels, an available number of multiplexed codes or an available transmission power for respective radio areas covered by base stations with the radio resource amount held in the holding unit for each of a plurality of layers of the layered data, and to determine, from layered data of a highest layer, at least one layered data of which the radio resource hold in the holding unit satisfies the area resource information; and a data transmitter configured to transmit the at least one layered data determination by the determination unit to the respective base stations.

3. The radio network controller according to claim 2, further comprising:

a resource information receiver configured to receive the area resource information from the base stations, wherein the determination unit is configured to determine the at least one layered data based on the area resource information received by the resource information receiver.

4. A base station comprising:

a holding unit configured to hold layered data and a corresponding resource amount indicating at least one of a number of channels, a number of multiplexed codes or a transmission power required for transmitting the layered data;

a determination unit configured to compare area resource information indicating at least one of an available number of channels, an available number of multiplexed codes or an available transmission power for respective radio areas covered by the base station with the resource amount held in the holding unit for each of a plurality of layers of the layered data, and to determine, from layered data of a highest layer, at least one layered data of which the resource amount held in the holding unit satisfies the area resource information; and a radio transmitter configured to transmit the at least one layered data determined by the determination unit to the mobile stations.

5. The base station according to claim 4, further comprising:

a resource information collection unit configured to collect the area resource information, wherein the determination unit is configured to determine the at least one layered data, based on the area resource information collected by the resource information collection unit.

6. A communication method used in a mobile communication system which comprises a holding unit configured to hold layered data and a corresponding radio resource amount indicating at least one of a number of channels, a number of multiplexed codes or a transmission power required for transmitting the layered data, the communication method comprising:

comparing area resource information indicating at least one of an available number of channels, an available number of multiplexed codes or an available transmission power for respective radio areas covered by base stations with the radio resource amount held in the holding unit for each of a plurality of layers of the layered data, and determining, from layered data of a highest layer, at least one layered data of which the radio resource amount held in the holding unit satisfies the area resource information; and transmitting the at least one layered data determined in the determining step to the mobile stations.

7. The radio network controller according to claim 2, wherein the area resource information is at least one of radio resources capacity for the respective radio areas covered by the base stations and radio resources amount currently available for the respective radio areas.

8. The base station according to claim 4, wherein the area resource information is at least one of radio resources capacity for the respective radio areas covered by the base station and radio resources amount currently available for the respective radio areas.

* * * * *